US006917675B2

(12) United States Patent
Lazarus et al.

(10) Patent No.: US 6,917,675 B2
(45) Date of Patent: Jul. 12, 2005

(54) METHOD AND APPARATUS FOR PROVIDING TELEPHONE CONFERENCE BRIDGING WITHIN A RESIDENTIAL GATEWAY

(75) Inventors: David B. Lazarus, Elkins Park, PA (US); Christopher J. Cotignola, Newtown, PA (US); Richard T. Walsh, Marlton, NJ (US)

(73) Assignee: General Instrument Corporation, Horsham, PA (US)

( * ) Notice: Subject to any disclaimer, the term of this patent is extended or adjusted under 35 U.S.C. 154(b) by 220 days.

(21) Appl. No.: 10/444,763

(22) Filed: May 23, 2003

(65) Prior Publication Data

US 2004/0234059 A1 Nov. 25, 2004

(51) Int. Cl.[7] .............................................. H04A 11/00
(52) U.S. Cl. .............................. 379/202.01; 379/204.01
(58) Field of Search .................... 379/202.01, 204.01, 379/201.01, 207.01, 207.02, 221.03, 221.04, 221.05, 221.06, 93.21, 93.15, 93.09, 142.14, 157–158

(56) References Cited

U.S. PATENT DOCUMENTS

| | | | |
|---|---|---|---|
| 6,671,262 B1 | * | 12/2003 | Kung et al. ............ 379/202.01 |
| 2002/0147777 A1 | * | 10/2002 | Hackbarth et al. |
| 2003/0137959 A1 | * | 7/2003 | Nebiker et al. |
| 2004/0019876 A1 | * | 1/2004 | Dravida et al. |
| 2004/0203677 A1 | * | 10/2004 | Brown et al. |
| 2005/0027818 A1 | * | 2/2005 | Friedman et al. |

* cited by examiner

Primary Examiner—William J. Deane, Jr.
(74) Attorney, Agent, or Firm—Volpe and Koenig, P.C.

(57) ABSTRACT

To set up a conference call which includes two, three or more participants, when the participating residential gateways (RGs) lack the necessary capability, a call agent designates a capable residential gateway RG, such as an embedded or stand-alone multi-media terminal adapter (eMTA or MTA) or a cable modem voice (CM), to serve as a residential conference mixer (RCM). The call agent routes outbound voice traffic from the participating RGs to the RCM, which mixes the traffic from the RGs participating in the conference call and directs the mixed voice traffic to the participating RGs. The call agent monitors the RGs for information useful to determine availability for conferencing.

15 Claims, 4 Drawing Sheets

METHOD AND APPARATUS FOR PROVIDING TELEPHONE CONFERENCE BRIDGING WITHIN A RESIDENTIAL GATEWAY

FIELD OF THE INVENTION

The present invention relates to providing voice/telephony within a residential gateway (RG). More particularly, the present invention relates to residential gateways which take advantage of conferencing resources of under-utilized residential gateway (RG) devices when the conference endpoints on RG devices lack sufficient resources.

BACKGROUND

Residential gateways (RGs) such as a PacketCable® (PC), a registered trademark of CableLabs, embedded multimedia terminal adapter (eMTA) or a stand-alone multimedia terminal adapter (sMTA) may not possess the resources required to support a conference call. Conferencing can be performed either within an RG or a conference bridge. Many deployments will not use a conference bridge for reasons of cost. Also, due to costs, an RG may not be able to support conferencing in some or all cases. Current two-line products cannot support three-way conference calls and busy line verification on both lines at the same time. Four-line products raise even more issues. It is also desirable to provide subscribers the ability to support conference calls having a larger number of participants.

The industry has struggled with this problem which may be characterized as a trade-off between more digital signal processor (DSP) power and DSP memory on the one hand and reducing cost on the other hand. Generally the problem has been addressed by either providing a more powerful communications gateway (CG) or providing a CG that is not able to meet all requirements in the worst case situation. The terms RGs and CGs described above and utilized herein are interchangeable and their design and functions are substantially the same especially with reference to the present invention.

FIG. 4 illustrates a communication network 10 which may employ the present invention to great advantage. Each network user has a Communication Gateway (CG) $14_1$ to $14_m$ (14), as shown in FIG. 1. The CGs 14 interface user equipment, such as telephones $12_1$ to $12_n$ (12) and computer modems, with the rest of the network. The CGs 14 are connected to an internet protocol (IP) network through a Cable Modem Termination System 16 (CMTS).

To handle the overhead functions of the IP network 18, a network management system 22, an Operations Support System (OSS) 24 and a call management system 20 are used. The Call Management System 20, "Call Agent", controls telephony calls sent through the network 18.

The IP network is connected to the public switched telephone network (PSTN) 28 via an IP network/PSTN gateway 26. The IP/PSTN gateway 26 acts as the interface between the IP network 18 and the PSTN 28 or other networks.

The simplified hardware of a CG 14 is shown in FIG. 5. The CG 14 has an RF connector 32 to receive RF signals from and transmit RF signals over the network 10. A tuner/amplifier 34 and a cable modem 36 are used to convert the received RF signals into digital baseband signals and digital baseband signals into RF signals for transmission.

The CG 14 also has a digital signal processor (DSP) 38 and codec 44 for processing voice signals. The DSP receives calls from the network and passes them to a TT 12, for example, through CODEC 44. Conversely, the CODEC 40 transfers calls to the network from the associated TT12 through the DSP 38. A processor 42 along with a random access memory (RAM) 44 and non-volatile memory (NVMem) 46 are used to perform various functions of the CG 14.

The simplified hardware of a Call Management System 20 is shown in FIG. 6. The Call Management System 20 comprises a Call Agent. The Call Agent 48 controls various functions of the Call Management System 20 and interacts with other modules 22,24. Call signaling 50 sends commands to control components of the network, such as the CGs 14. Other components of the Call Management System 20 for use in performing its functions are the communications stacks 52, network interface module (NIM) 54, processor 58, RAM 60, NVMem 62 and permanent storage 56.

SUMMARY

The present invention resolves these problems by using resources of an idle RG(s) to support conferencing that cannot be supported by another RG and employing an RG to do conferencing when the endpoints of the RG are not involved in the call. The implementation of the invention, in one preferred embodiment employs network-based call signaling (NCS). An ideal network may contain many low-cost multi-media terminal adapter (MTA) devices and a few feature-rich eMTA devices that can be used for remote conference bridging.

BRIEF DESCRIPTION OF THE FIGURES

The present invention will be understood from a consideration of the accompanying drawings wherein like numerals designate like elements and, wherein.

DETAILED DESCRIPTION OF THE INVENTION AND THE PREFERRED EMBODIMENTS THEREOF

The conferencing of telephones has been a source of revenue for telephone companies for a number of years. As cable modems with telephony and other residential gateways (RGs) with telephony are deployed, the ability to provide conferencing provides a source of revenue for the service provider.

In the packet cable models currently in use as well as other similar schemes, conferencing is performed within one or more of the participant gateways or by a network bridge. Many deployments refrain from use of a network bridge to save costs which is also a major factor in residential gateway design. The most likely economic approach is to design a residential gateway to support some conferencing but is not able to handle the capacity of an unlikely worst-case situation. As an example, a two-line residential gateway (RG) may be able to support two three-way calls concurrently but is incapable of supporting a three-way call concurrent with a four-way call or is incapable of supporting two (2) four-way calls. Designing the residential gateway to support two (2) four-way calls adds unnecessary cost to the product since the likelihood of occurrence of the worst-case situation occurring is small.

The current design of call conferencing limits the number of conference participants to the number of network ports available on the residential gateways that host the end points of the conference call.

The present invention provides a residential gateway-based communication network having an unbounded conference call capability while avoiding the need for a network bridge or overpowered (and thus costly) residential gateways. The present invention coordinates idling residential gateways on the network to take advantage of their unused conference mixing resources for the conference call. The present invention further allows conferencing between two residential gateways that cannot support conferencing.

Figure 1:
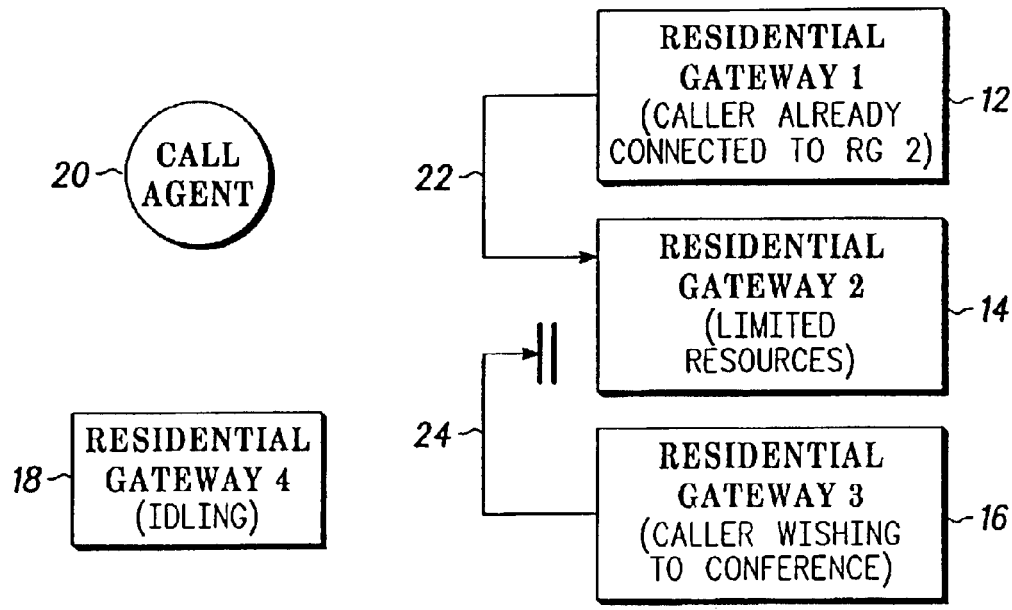
FIG. 1 shows the architecture of a system for accommodating a two-way call.
Figure 4:
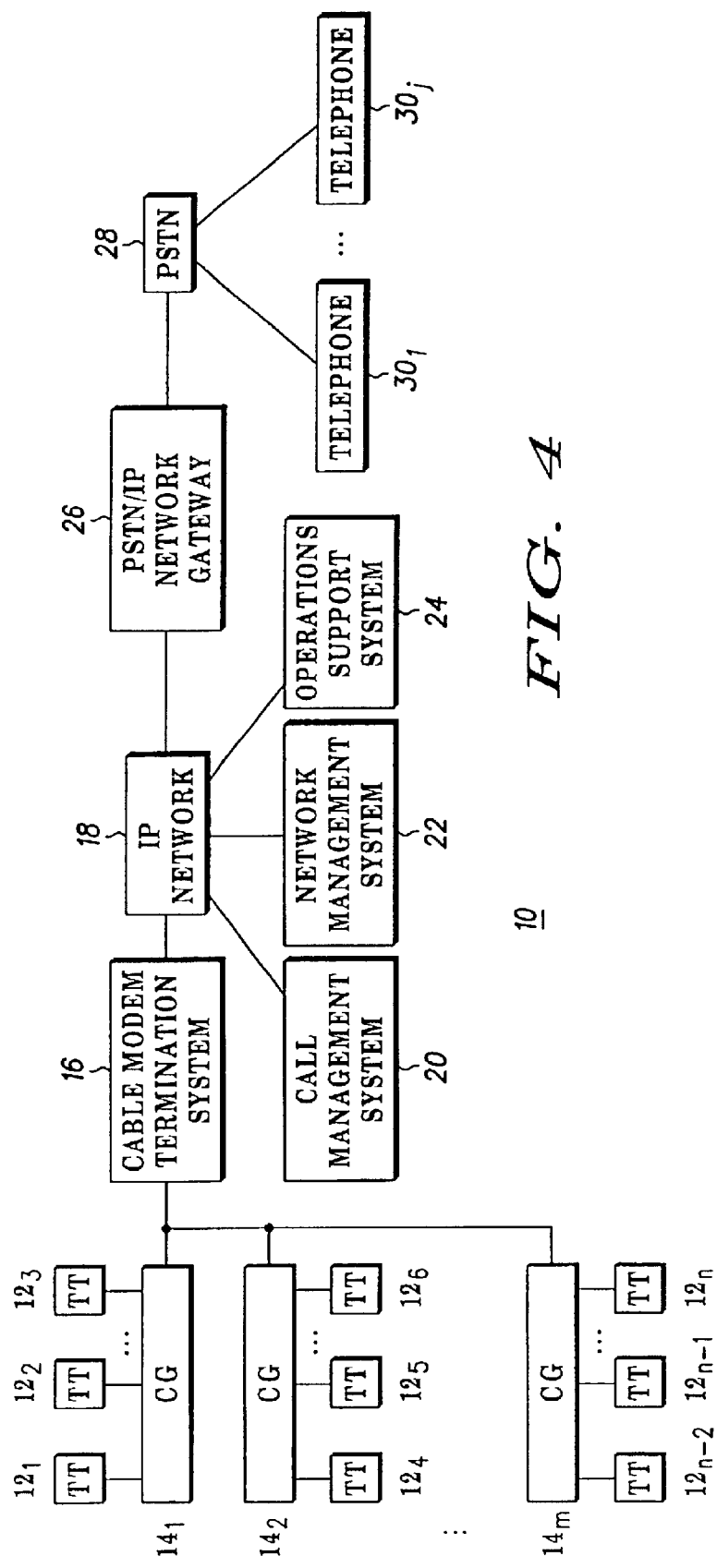
FIG. 4 is a simplified illustration of a communications network.
Figure 5:
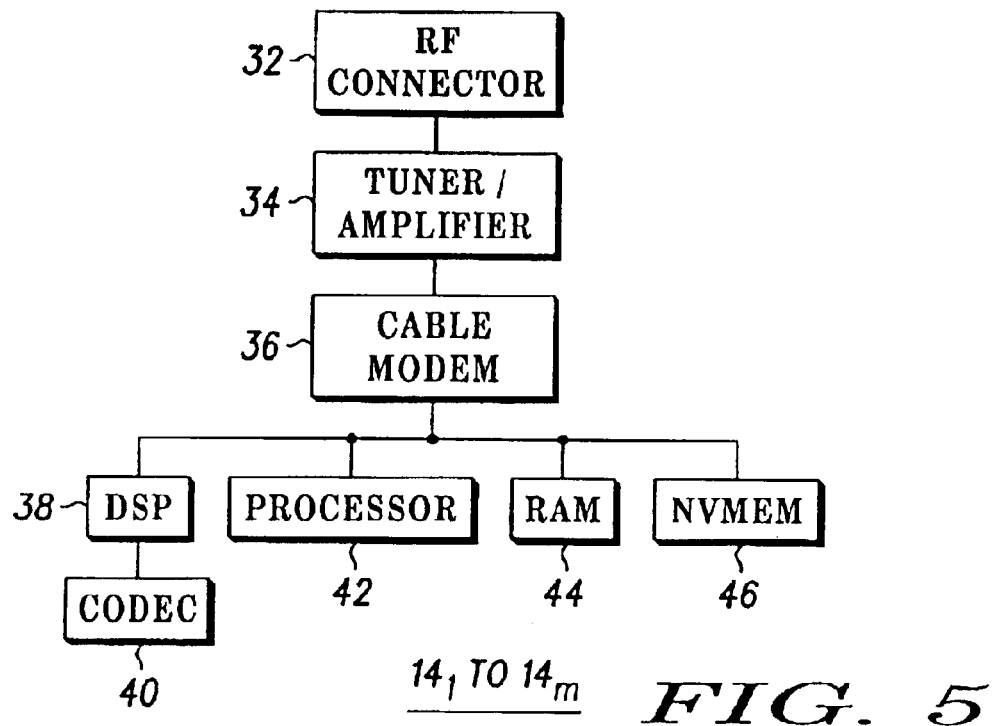
FIG. 5 is a simplified illustration of a communications gateway (CG) employed in the network of FIG. 4 and which is also referred to as a residential gateway (RG).
Figure 6:
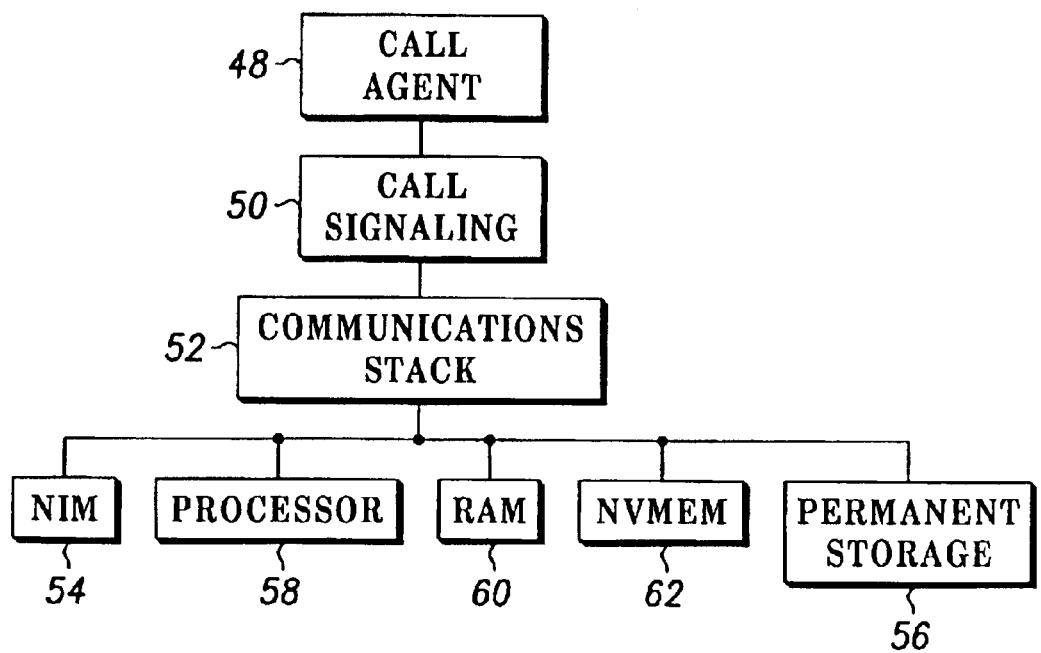
FIG. 6 is a simplified illustration of a call management system (CMS) employed in the network of FIG. 4.

FIG. 1 shows the architecture of the system 10 presently in use and comprised of four (4) residential gateways 12 (RG1), 14 (RG2), 16 (RG3) and 18 (RG4), and a call agent 20. Refer to FIGS. 4–6 for further details regarding the gateways and the call agent. Residential gateways 12 (RG1) and 14 (RG2) are involved in a call, as per connecting link 22. RG2 (14) wishes to add RG3 (16) to the conference call, as per incomplete link 24. RG1, RG2 and RG3 do not have the resources to accommodate RG3 in the conference call and the system does not have a conferencing bridge. As a result, the three-way conference call cannot be set up.

Figure 2:
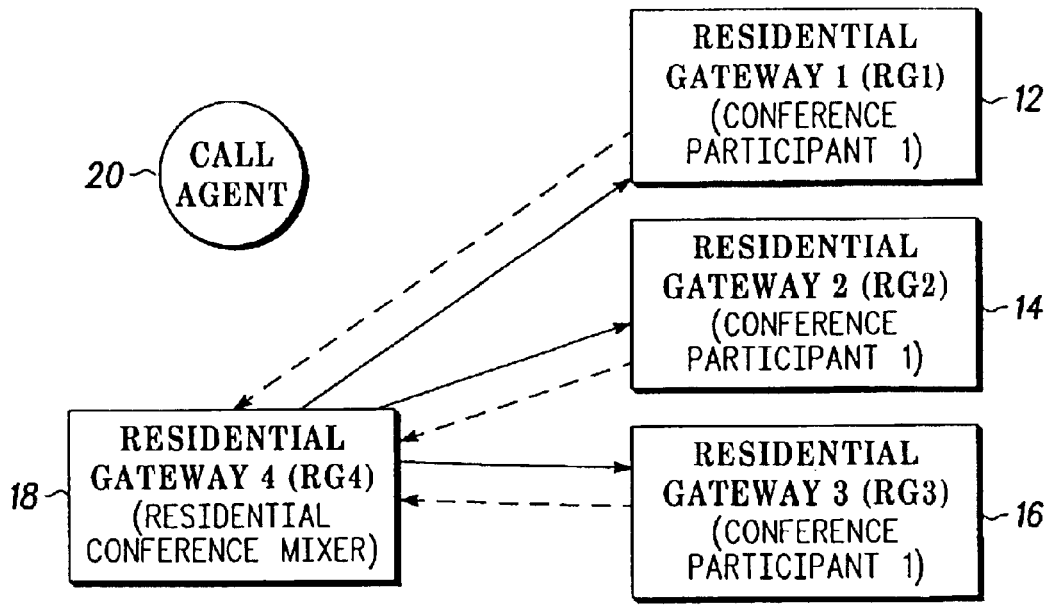
FIG. 2 is a diagram showing implementation for providing conference calls utilizing a technique embodying the present invention.

FIG. 2 shows an arrangement embodying the principles of the present invention, which includes the residential gateways 12, 14, 16 and 18 as well as the call agent 20. However, the call agent 20 has capabilities not heretofore provided. Although the example to be described shows the technique for creating a three-way conference call, it should be understood that the number of participants is not limited to three and that a greater number of subscribers may participate in a conference call.

Figure 3:
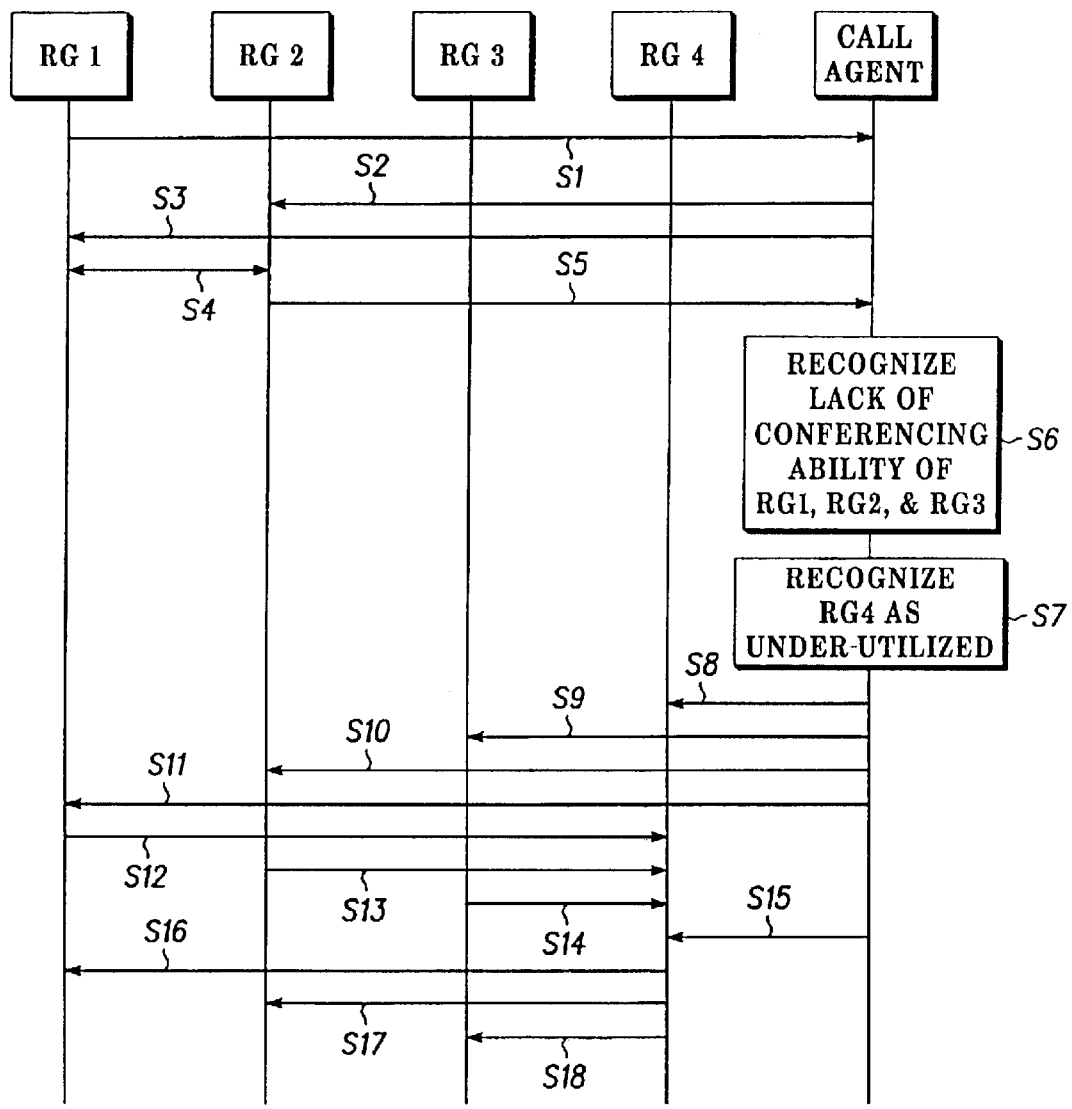
FIG. 3 is a flow diagram useful in explaining the technique of the present invention.

More specifically, call agent 20 coordinates the operation of each RG12–RG18 via network-based call signaling (NCS) signaling. Call agent 20 selects an idle or under-utilized RG. The RG that is selected is referred to as the residential conference mixer (RCM). Outbound traffic from residential gateways 12, 14 and 16 (RG1, RG2 and RG3) is routed to the residential conference mixer (RCM), trans-coded (if needed), mixed, trans-coded (if needed) and then routed back to the residential gateways 12, 14 and 16. Each RG12, 14 and 16 receives a mixture of the output signals from all of the other endpoints in the conference call. In the example given, RG1 (12) is shown as having the caller already connected to RG2 (14), represented by connecting link 22. RG3 (16) has a caller wishing to conference, represented by a yet to be connected line 24. The order of the method steps to establish the conference is as follows, making reference to FIG. 3:

RG1 (12), at step S1, requests set up of a two-way call. Call agent 20 responds, at steps S2 and S3, to set up a two-way call between RG1 and RG2 (12 and 14) which is established at step S4.

A potential conference participant at RG3 (16) desires to be added to the call between RG1 and RG2, the request being made by RG2, at step S5. In the example given, RG1, RG2 and RG3 lack the resources to support the conference call.

Call agent 20 detects this lack of resources, at step S6, and identifies RG4 (18) as under utilized, at step S7.

Call agent, at step S8, directs RG4 (18) to be configured for RCM mode, indicating the number of conference participants, voice coders/decoders (CODECs) required, source addresses, destination addresses, etc.

Call agent 20 directs RG1 (12), RG2 (14) and RG3 (16) to route voice traffic to RG4 at steps S9, S10 and S11, respectively. RG1, RG2 and RG3 route voiced traffic to RG4 at steps S12, S13 and S14. Note also FIG. 2 which depicts the outbound traffic OT1, OT2 and OT3 from RG1, RG2 and RG3 to RG4.

Call agent 20, at step S15, directs RG4 (18) to mix incoming traffic and perform trans-coding, if needed and re-broadcasting of the mixed traffic to destinations RG1, RG2 and RG3.

RG4, at steps S16, S17 and S18, broadcasts the mixed traffic to destinations RG1, RG2 and RG3, respectively.

Call agent 20 keeps track of the status of each RG12–RG18. The call agent 20 knows if an RG can support conference mixing and whether that RG can serve as an RCM. When call agent 20 is adding another endpoint to an existing call, RGs that are hosting the endpoints are surveyed to determine if any of the RGs have the capacity to support conferencing without an RCM. Generally, it is preferable to avoid using an RCM if the RGs in the conference call can handle the mixing without an RCM, thus minimizing the round-trip delay and bandwidth cost.

When RGs do not have the capacity to support the mixing, an RCM is allocated to the conference call.

An RG may lack capacity to support conferencing because of:

1. a lack in horsepower of the digital signal processor (DSP) incorporated in the RG;

2. a lack of a Central Processing Unit (CPU) or a lack of memory capacity;

3. the lack of ability to support the necessary bandwidth or number of connections;

4. other active calls supported by the RG may impact the determination;

5. its software may not include this feature; and 6. the RG cannot support the necessary number of service flows.

Call agent 20 thus chooses candidates for the residential conference mixer (RCM) based upon one or more of the following:

1. An RG that is not provisioned as an MTA may be selected as an RCM. For example, a subscriber may cancel phone service while retaining high speed data service. The subscriber's un-provisioned MTA is an excellent candidate for an RCM since it is highly unlikely that it will have to support an unexpected telephone call.

2. DSP horsepower—when selecting between RG units, the call agent selects the one with the most unused DSP capacity. For example, an RG that can support four (4) connections but is provisioned for a single idle endpoint is a better selection than a similar unit with an active call or a unit that can only support two connections;

3. available network ports/cable modem horsepower. For example, an MTA that currently has many, for example 14, unused service flows is a better selection than an MTA that has several, for example 3 or 4, unused service flows;

4. available voice CODECs for trans-coding such as G.711 (an International Telecommunications Union (ITU) standard for audio CODECs), G.728 (an audio compression standard), G.726 IT (a standard for encoding G.711 PCS into compressed bit rates), etc.;

5. available bandwidth, for example, when selecting between two equivalent units on different CMTS units, the call agent 20 selects the one that has the most unreserved bandwidth; and 6. likelihood of an RG to become busy with activities arising from local activities. For example, when selecting between two equivalent units that do not currently have connections, the call agent selects that unit which is not predicted to be busy at that time. The prediction can be based on past use or patterns of use.

Call agent 20 is also capable of directing an RG to set up for the RCM mode given the source, destination and number of conference participants.

The mixing function of a conference call may be moved from one RCM to another inactive RCM if:

1. the active RCM must honor a commitment of resources. For example, if the end user wants to make a phone call and its RG is being used as an RCM, it may be necessary to move the RCM function to another RG; and/or 2. to reduce bandwidth cost or delay when a better option becomes available.

If an active RCM needs to support a conference call that it has initiated or terminated, another RCM can be employed to support the new conference call.

A Multimedia Terminal Adapter (MTA), in order to function as an RCM, includes the following:

The signaling function within the RG receives and processes new commands that direct the RG to enter the RCM mode. Signal processing then directs the voice channel processing to conference together the given voice sources.

A PacketCable MTA will respond to extended NCS, extended audit endpoint and audit connection messages The MTA has the capability of reporting that it can function as an RCM and further report the resources available to be an RCM and its status as an RCM. There is most likely an equivalent set of the functions in other signaling protocols. Although the present invention employs the NCS signaling protocol, signaling protocols such as H-323, SIP or DSC may also be used. All of these protocols provide the functions needed for the present invention.

In order to function as a residential conference mixer, resources from the RC's voice subsystem are allocated without effecting the local user. Any function or feature that is available to the local user while the MTA is not in the RCM mode is still available in the RCM mode. When the signal function directs the voice processing function to conference, the voice processor function allocates voice channels for each of the endpoints being conferenced. The channels that are allocated are typically not in use. The voice processing function collects the audio data from conference participant and generates a mixed output for each of the participants by adding the Pulse Code Modulation (PCM) samples together. It should be noted that techniques other than PCM may be used to represent a sound. Each endpoint is sent an output which is generated by mixing data from all of the other endpoints.

For network based call signaling (NCS), the create connection (CRCX), modify connection (MDCX) and delete connection (DLCX) commands are extended to support connections to an RCM, which is accomplished, as one example, by adding the notion of a null endpoint. Conferencing is accomplished by connecting conference endpoints to a null endpoint on the RCM. An RCM null endpoint does not have a local endpoint and the null endpoint is just a short hand for conferencing. Instead of using a physical endpoint name such as "aaln/1", a string "null/1" may be employed. In NCS, "aaln/1" is the name of the first analog phone line. The RCM null endpoints are preferably numbered so that multiple conference bridges could be supported within a single RCM. A null endpoint does not have any interaction with a phone line at the RCM. To conference together three (3) endpoints at an RCM, the call agent (20) sends three (3) CRCX commands to the RCM, one for each endpoint. All three (3) CRCX commands are coupled to the null endpoint and the conference mode is employed. Alternatively, a conference mode, identified herein as "resmix", can be used.

Appendix B of the PacketCable NCS Protocol Specification identifies a range of "modes." The present invention further includes "resmix." as one of the "modes." "Resmix" is defined herein as: (1) Traffic from the network on a connection is added to each connection's traffic back into the network, except on the connection it came from. (2) Nothing is played out to the local telephone line. (3) Audio data from the local phone line is not added to any of the connections.

The NCS "audit endpoint" audit capabilities" commands are extended to declare that an RG is able to act as an RCM and preferably indicating how good it will be at that role. Further, when an RCM is conferencing endpoints, it must report this status when audited.

The present invention is applicable to small office/home office (SOHO) products as well as residential products.

Multiple RCM devices, or a mix comprised of RCMs and other mixers, can be used in a single conference call to support a larger number of participants than a single RCM is capable of supporting.

When an embedded MTA (eMTA) is installed and is used only as a cable modem (CM), the eMTA can serve ideally as an RCM and is likely to exist in sufficient numbers within a network to be able to provide RCM needs. The multiple system operator (MSO) may deploy the eMTA as a data modem having the future capability of providing telephony. As some customers may cancel telephone services or as their needs change or as customers may be out of town for an extended period of time, these eMTAs may be called upon to serve as an RCM.

Unprovisioned MTA's can be placed strategically throughout the cable plant to be used strictly as RCM's by the MSO to lessen the chance of disrupting an existing subscriber service.

What is claimed is:

1. A method for providing a conference call involving at least three subscribers employed in a network having at least one call agent and a plurality of residential gateways (RGs), wherein at least a first and a second one of said RGs have an existing call there between, comprising:
   a) one of the RGs participating in the existing call requesting a conference call to add another RG to the existing call, said another RG lacking resources to support the conference call;
   b) said call agent, responsive to said lack of resources, identifying an under-utilized RG which is not participating in the existing call;
   c) said call agent directing the under-utilized RG to serve as a residential conference mixer (RCM) and identifying the number of conference participants, including said another RG voice coders/decoders (CODECS) required and source and destination addresses to the under-utilized RG;

d) said call agent directing the RGs participating in the existing call to route voice traffic to the under-utilized RG;

e) RGs participating in the existing call, responsive to step (d), directing voice traffic of the requested conference call to the under-utilized RG; and f) said call agent directing the under-utilized RG to mix incoming voice traffic and rebroadcast mixed traffic to the RGs.

2. The method of claim 1 further comprising:

g) all of said RGs participating in the existing call, responsive to step (d), sending outbound voice traffic to the under-utilized RG; and h) said under-utilized RG mixing the incoming voice traffic of step (f) and broadcasting the mixed voice traffic to all of the RGs participating in the existing call.

3. The method of claim 1 wherein the call agent, in the performance of step (c), employs network-based call signaling (NCS).

4. The method of claim 1 wherein the call agent performs step (c) in accordance with dynamic quality of service DQ.S and DOCSIS 1.1 specifications.

5. The method of claim 1 further comprising:

(g) said call agent in the performance of step (b), monitors RGs in the network for availability.

6. The method of claim 5 wherein the call agent, in the performance of step (g), determines if the RGs participating in the conference call have a capacity to support conferencing without need for selecting an RG not participating in the existing call to serve as an RCM.

7. The method of claim 6 wherein the call agent, in determining availability of RGs to support conferencing, identifies a given RG under consideration as lacking a capacity to support conferencing due to one or more of the factors, including:

a lack in horsepower of a digital signal processor (DSP) contained in the given RG;

a lack of central processing unit resources in the given RG;

a lack of memory capacity in the given RG;

a lack of ability of the given RG to support the bandwith necessary for a conference call;

a lack in a number of connections available at the given RG;

a number of active calls currently supported by the given RG;

the RG lacks software to support conferencing; and the RG cannot support a necessary number of service flows.

8. The method of claim 1 further comprising:

(g) said call agent moving a mixing function of a conference call from the RG acting as the RCM to an inactive RG not participating in the existing call when at least one of the following conditions is present:

the acting RCM must honor a commitment of resources;

when an inactive RG has reduced bandwidth costs, reduced delay or a better option available compared with the acting RCM; and when the active RCM needs to support a conference call it has initiated or terminated.

9. A network having at least one call agent and a plurality of residential gateways (RGs), at least a first and a second one of said RGs are participating in an existing call; comprising:

one of said first and second RGs having means for requesting a call conference to add another RG to the existing call; said another RG lacking resources to support the conference call;

said call agent having first means responsive to said lack of resources for identifying an under-utilized RG not participating in the existing call;

said call agent having second means directing the under-utilized RG to serve as a residential conference mixer (RCM) and identifying the number of conference participants including said another RG, voice (coders/decoders) (CODECS) required and source and destination addresses to the under-utilized RG;

said call agent having third means for directing the RGs participating in the existing call to route voice traffic to the under-utilized RG;

said RGs participating in the existing call having means responsive to said third means for directing voice traffic of the requested conference call to the under-utilized RG;

said call agent having fourth means directing the under-utilized RG to mix incoming voice traffic and rebroadcast mixed traffic to the RGs participating in the existing call.

10. The network of claim 9 further comprising:

said RGs participating in the existing call each having means responsive to the call agent third means for sending outbound voice traffic to the under-utilized RG; and said under-utilized RG having means for mixing the incoming voice traffic and broadcasting the mixed voice traffic to the RGs participating in the existing call.

11. The network of claim 9 wherein the call agent second means includes network-based call signaling (NCS) means.

12. The method of claim 9 wherein said call agent includes fifth means for monitoring RGs in the network for availability.

13. The network of claim 12 wherein said fifth means includes means responsive to the request to add said another RG to the existing call to determine if the RGs participating in the existing call prior to said another RG becoming a participant have a capacity to support conferencing without need for selecting another RG to serve as an RCM.

14. The network of claim 13 wherein the fifth means includes means for determining availability of RGs to support conferencing includes means which identifies a given RG under consideration as lacking a capacity to support conferencing due to one or more of the factors, including:

a lack in horsepower of a digital signal processor (DSP) contained in the given RG;

a lack of a central processing unit in the given RG;

a lack of memory capacity in the given RG;

a lack of ability of the given RG to support the bandwith necessary for a conference call;

a lack in a number of connections available at the given RG;

a number of active calls currently supported by the given RG;

the RG lacks software to support conferencing; and the RG cannot support a necessary number of service flows.

15. The network of claim 9 wherein the call agent further comprises means for moving a mixing function of a conference call from the RG acting as an RCM to another inactive RG when at least one or more of the following conditions is present:

the RG acting as an RCM must honor a commitment of resources;

when an inactive RG has reduced bandwith costs, reduced delay or a better option available compared with the acting RCM; and when the RG acting as an RCM needs to support a conference call it has initiated or terminated.

* * * * *